US010322964B2

(12) United States Patent
Linow et al.

(10) Patent No.: US 10,322,964 B2
(45) Date of Patent: Jun. 18, 2019

(54) METHOD FOR PRODUCING A REFLECTOR ON A REFLECTOR BASE MADE OF GLASS

(71) Applicant: Heraeus Noblelight GmbH, Hanau (DE)

(72) Inventors: Sven Linow, Darmstadt (DE); Jürgen Weber, Kleinostheim (DE); Jörg Bressem, Darmstadt (DE)

(73) Assignee: Heraeus Noblelight GmbH, Hanau (DE)

( * ) Notice: Subject to any disclaimer, the term of this patent is extended or adjusted under 35 U.S.C. 154(b) by 0 days.

(21) Appl. No.: 15/527,495

(22) PCT Filed: Nov. 2, 2015

(86) PCT No.: PCT/EP2015/075381
§ 371 (c)(1),
(2) Date: May 17, 2017

(87) PCT Pub. No.: WO2016/083078
PCT Pub. Date: Jun. 2, 2016

(65) Prior Publication Data
US 2017/0327415 A1    Nov. 16, 2017

(30) Foreign Application Priority Data
Nov. 24, 2014  (DE) .................. 10 2014 117 199

(51) Int. Cl.
*C03C 17/10* (2006.01)
*C03C 17/00* (2006.01)
*B41J 3/407* (2006.01)

(52) U.S. Cl.
CPC ............ *C03C 17/10* (2013.01); *C03C 17/003* (2013.01); *B41J 3/4073* (2013.01); *C03C 2217/255* (2013.01); *C03C 2218/119* (2013.01)

(58) Field of Classification Search
CPC ....... C03C 17/005; C03C 17/10; B41J 3/4073
(Continued)

(56) References Cited

U.S. PATENT DOCUMENTS 5,281,635 A    1/1994  Bishop
2002/0126487 A1*  9/2002  Zhao .................. C23C 28/00
362/257

(Continued)

FOREIGN PATENT DOCUMENTS

CN          1066863 A    12/1992
CN        101939114 A     1/2011
(Continued)

OTHER PUBLICATIONS

Office Action dated Sep. 23, 2015 in Application No. DE 102014117199.3.
(Continued)

*Primary Examiner* — Elizabeth A Burkhart
(74) *Attorney, Agent, or Firm* — Panitch Schwarze Belisario & Nadel LLP

(57) ABSTRACT

A method for producing a reflector on a reflector base made of glass is provided. According to the method, a metal-containing coating fluid is deposited on a coating surface and subjected to a burning-in treatment at a temperature below a softening temperature of the glass forming the reflector layer. Deposition of the coating fluid proceeds using a contactless method by inkjet technology. This makes it possible to deposit a reflector layer in a reproducible way and with tight tolerances having a specified layer thickness, as well as to create clean edges without a printing block or similar device. The coating fluid is moved by a print head equipped with a plurality of nozzles and is movable in a movement plane relative to the coating surface. The coating fluid is sprayed onto the coating surface by the print head (Continued)

under pressure and in the form of droplets emerging from the nozzles.

11 Claims, 1 Drawing Sheet

(58) Field of Classification Search
USPC .......................................... 427/165, 106, 123
See application file for complete search history.

(56) References Cited

U.S. PATENT DOCUMENTS

| | | | | |
|---|---|---|---|---|
| 2012/0321783 | A1* | 12/2012 | Hampden-Smith | B41M 1/22 427/162 |
| 2013/0257984 | A1* | 10/2013 | Beier | B41J 2/135 347/37 |
| 2015/0103529 | A1* | 4/2015 | Cai | F21K 9/233 362/296.02 |
| 2016/0243619 | A1* | 8/2016 | Gothait | C09D 11/30 |

FOREIGN PATENT DOCUMENTS

| | | |
|---|---|---|
| CN | 103358710 A | 10/2013 |
| DE | 1540740 A1 | 1/1970 |
| DE | 3530873 A1 | 3/1987 |
| DE | 10355448 A1 | 7/2005 |
| DE | 202009002392 U1 | 5/2009 |
| EP | 514073 A2 | 11/1992 |
| EP | 2644392 A2 | 10/2013 |
| JP | S59186293 A | 10/1984 |
| JP | 2003141904 A | 5/2003 |
| JP | 2006336075 A | 12/2006 |
| JP | 200965219 A | 3/2009 |
| JP | 2013202781 A | 10/2013 |
| WO | 2014053249 A1 | 4/2014 |

OTHER PUBLICATIONS

Int'l Search Report dated Jan. 20, 2016 in Int'l Application No. PCT/EP2015/075381.
Office Action dated Jun. 12, 2018 in JP 2017527566.
Office Action dated Jan. 29, 2019 in CN Application No. 201580063274.8.

* cited by examiner

METHOD FOR PRODUCING A REFLECTOR ON A REFLECTOR BASE MADE OF GLASS

CROSS-REFERENCE TO RELATED APPLICATIONS

This application is a Section 371 of International Application No. PCT/EP2015/075381, filed Nov. 2, 2015, which was published in the German language on Jun. 2, 2016, under International Publication No. WO 2016/083078 A1 and the disclosure of which is incorporated herein by reference.

BACKGROUND OF THE INVENTION

The present invention relates to a method for producing a reflector on a reflector base made of glass having a curved surface, provided in the area of a coating surface with a metal-containing reflective layer, in particular a noble metal-containing reflective layer, in which a metal-containing coating fluid is deposited on the coating surface and is subjected to a burning-in treatment at a temperature below a softening temperature of the glass.

Functional layers made from reflective metals are deposited on lamps, light sources, or separate reflector components. Here, reflector components are elements which are used in light sources or other devices that reflect optical radiation. Suitable reflector materials are, for example, gold, silver, copper and aluminum, based on their reflectivity according to the respective spectral range.

From DE 35 30 873 A1, a method of this generic class is known for producing a headlamp reflector. Here, an approximately 5 μm thick layer made from a metal-containing paste is deposited by a pad printing method on the concave inner side of a reflector body made of glass. The reflector body comprises high-temperature glass having a softening point Tg of approximately 550° C. The paste comprises a solution of platinum or gold resinate in a fat oil having low additives (~1%) of resinates from glass formers for adhesion. The reflector body having the deposited resinate layer is brought to a temperature of around 500° C. in a furnace. During this heat treatment, the gold resinate decomposes into metallic gold and resin acid, which in turn is volatilized, just like the other components of the paste, by the high burning-in temperature. A thin, metallic reflective layer having a thickness of approximately 0.1 μm remains on the reflector body. This is resistant to corrosion, so that a coating layer is not required for protection from corrosion.

In the pad printing method, the printing paste is transferred from the printing block to the printing object by an elastic pad made of silicone rubber.

Instead of this method, for depositing noble metal resinate layers that can be burned-in for the purpose of producing reflectors, template or screen-printing methods are also common. For screen printing, the printing paste is deposited with a rubber squeegee through a fine-mesh fabric onto the printing object, wherein the mesh openings of the fabric are impermeable at positions at which no paste should pass through the template.

The above-described printing methods require the previously complicated production of a printing block or template for the exact transfer of printing paste. This disadvantage is avoided by deposition methods in which the paste is spread on or sprayed on. These procedures for the production of infrared-reflective linings of IR emitters, as well as for suitable gold and other noble metal resinate compositions, are described, for example, in German Patent No. 1 540 740.

In these methods, however, it is difficult to reproducibly maintain a specified layer thickness of the noble metal-containing paste, as well as defined contours and edges, and to produce small structures of less than 2 mm. Frequently, beads, non-straight profiles, spray and droplet artifacts are observed, which require complicated rework processing. Losses of usually expensive pastes due to overdosing, dripping, overspraying, waste, and rework lead to high material costs.

The use of noble metals, in particular, exacerbates the combination of inexact dosing, variation of consumption, high losses, as well as monitoring the remaining material. Thus, allocating the exact consumption to certain products or orders is possible only in an unsatisfactory way. Also, monitoring and preventing theft is only possible in an unsatisfactory way.

Therefore, an objective of the present invention is to provide a method for producing a reflector on a lamp, a light source, or a separate reflector component, which makes it possible to deposit a reflector layer having a specified layer thickness in a reproducible way with tight tolerances, as well as to generate clean edges without a printing block or the like. In particular, losses of noble metals should be minimized, and a close monitoring and order-related tracking of the material flow and allocation of consumption to individual orders or workpieces should be made simpler.

BRIEF SUMMARY OF THE INVENTION

In the method according to the present invention, the deposition of the coating fluid proceeds using a contactless method by inkjet technology, in which the coating fluid is moved by a print head equipped with a plurality of nozzles and is movable at least in a plane of movement relative to the coating surface, and the coating fluid is sprayed onto the coating surface by this print head under pressure and in the form of droplets emerging from the nozzles.

In the method according to the present invention, the metal-containing coating fluid for producing the reflective surface layer is deposited by inkjet technology. Here, a printer is used that is equipped with one or more industrial print heads that are movable and therefore at least positionable in a plane along the coating surface using a computer and program-controlled method.

Each of the print heads is connected fluidly to a reservoir for the coating fluid and provided with a plurality of outlet nozzles that run in one or more parallel rows. Each of the outlet nozzles can preferably be controlled individually in the sense that the nozzle opening is closed or opened. When a nozzle opening is open, the metal-containing coating fluid is fed onto the surface to be coated at a pressure that can be specified using a dropwise and contactless method.

Here, the coating surface is moved relative to the print head. Depending on the speed and direction of the relative movement and control of the nozzles, the deposition process is controlled so that the metal-containing coating fluid is printed in a specified pattern on the surface. This arrangement allows the deposition not only of simple, complete-surface layers, but also structures that are built up, for example from individual, surface—touching or non-touching—layer areas.

The coating fluid is then dried and burned-in and converted into a mirror-reflecting, reflective layer. During the burning-in process, organic components are converted into gas by oxidation with air, producing thorough cross-linking and the formation of a closed metal layer having good adhesion to the glass.

The inkjet technology permits a flexible and fine-element deposition of the coating fluid, so that, advantageously, structures can be produced that are parts of electrical circuits, or structures having gradual transitions between transmission and reflection regions, or even non-reflective areas in an otherwise reflective surface, which can be used, for example, as a window for looking into the interior of a lamp.

Coating flaws, like those that occur in the technologies mentioned at the outset, are avoided. Also, the pre-production of a printing mask, a template, or a printing block is not required. One special advantage of the method is that the quantity of metal required for producing a layer can be set, so that a specified and optimal result is achieved in a reproducible and comprehensible way. An optimal result here means high reflectivity with minimal use of materials.

The coating fluid contains a metal or multiple metals preferably in elemental form.

This simplifies the production of a polished, reflective surface. In metallo-organic inks, the metal is present in a complex compound, for example gold in complexes with chlorine compounds. Other suitable metals are, in particular, aluminum, copper, or silver, depending on in which wavelength range the reflection is to take place, or which other functions of the layer are desired, such as good electrical conductivity.

It has proven effective if the coating has a viscosity in the range of 10 to 30 mPa·s.

The flow behavior of this coating fluid is created to have properties so that it:

(i) is to be printed by inkjet technology,
(ii) produces good wetting with the glassy surface to be coated, and
(iii) does not easily run off or form droplets.

The relative movement between the coating surface and print head is realized by program-controlled movement of the print head along the coating surface or by movement of the coating surface along the print head or by a combination of both types of movement.

In particular, for the coating of elongated, cylindrical profiles, it has proven effective if the relative movement between the coating surface and print head comprises a translation movement of the reflector base along the print head.

Here, the component to be coated is guided along the print head by a displacement unit, for example, a conveyor belt, having the coating surface which can have a length of multiple meters. The print head is here stationary in the axial direction. The print head can be moved in the circumferential direction and/or in the radial direction.

In the simplest case, the reflector base is provided as a cylinder and the coating surface is a longitudinal strip of an outer surface extending over a partial circumference of the cylinder, wherein the print head is designed for depositing the coating fluid over a partial circumference of 60 angular degrees, preferably for a partial circumference of 90 angular degrees.

For generating a layer that covers 180 angular degrees of a round profile, two to three print heads are used accordingly, whose nozzle outlet planes enclose an angle of 90 degrees or less.

The pattern of outlet nozzles usually has a rectangular design, wherein a plurality of nozzles is arranged in a row or in a few rows. The print head accordingly has a short side and a long side. Therefore it is possible, even for round or complex shaped surfaces having small radii of curvature (for example 5 mm), to ensure the desired high homogeneity of the coating and also to produce clean, clear, and overspray-free edges. For printing elongated profiles, the print head or the print heads are arranged with their long sides transverse to the longitudinal axis direction of the profile.

Here, it has proven effective if the longitudinal strip to be coated has a width in the range of 20 to 65 mm.

In the simplest case, the reflector base is constructed as a lamp bulb of an infrared emitter. It is constructed, for example, as a tube having a round, oval, or polygonal cross section or in a special shape, such as a so-called twin tube. It is preferably made of quartz glass or borosilicate glass.

A procedure is preferred in which the nozzles have outlet openings running in a common outlet plane, wherein a distance in the range of 5 to 10 mm is set between the outlet plane and the coating surface.

By maintaining a distance in this range, an overspraying of the coating fluid can be largely avoided even for curved surfaces.

It has further proven favorable if a minimal coverage of the coating surface with the coating fluid is calculated and the application of the coating fluid is program-controlled, so that a surface coverage is produced that essentially corresponds to the minimum coverage.

The deposition of the coating fluid is thus controlled so that the metal produces a uniform surface coverage, wherein the minimum surface coverage produces the optimum for minimum transmission and material costs for the later reflector layer after the conversion still to be performed.

The layer thickness of the coating fluid on the glass preferably lies in the range between 20 µm and 40 µm. The layer thickness can be determined, for example, by evaluating the flow rate of the individual nozzles (by counting the droplets) and measuring the covered surface. The metal content of the layer is typically in the range of 10 to 15 weight %.

The reflector layer produced by the burning-in preferably has a desired thickness in the range of 50 nm to 200 nm. The uniformity of the layer thickness evidenced by a thickness measured at five measurement points distributed uniformly over the reflector layer deviating by a maximum of 10% from the desired thickness.

The thickness of the metallic layer can be determined from the layer thickness of the original coating fluid layer and the known volume portion of metallic components of the coating fluid. Alternatively or additionally, it can also be determined by sputtering or transmission of extremely short-wave radiation (X-ray or gamma radiation).

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
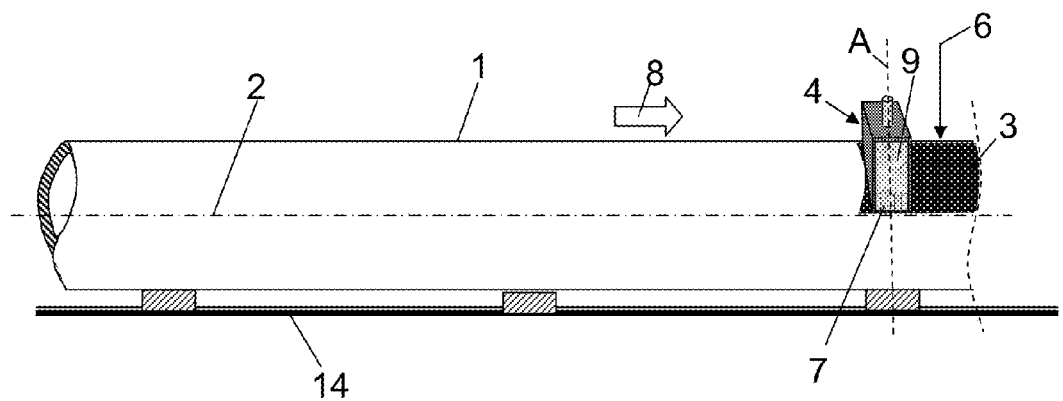
FIG. 1 illustrates one embodiment of the reflector produced according to the present invention as a partial reflector layer on an infrared lamp tube together with a print head in a longitudinal section.
Figure 2:
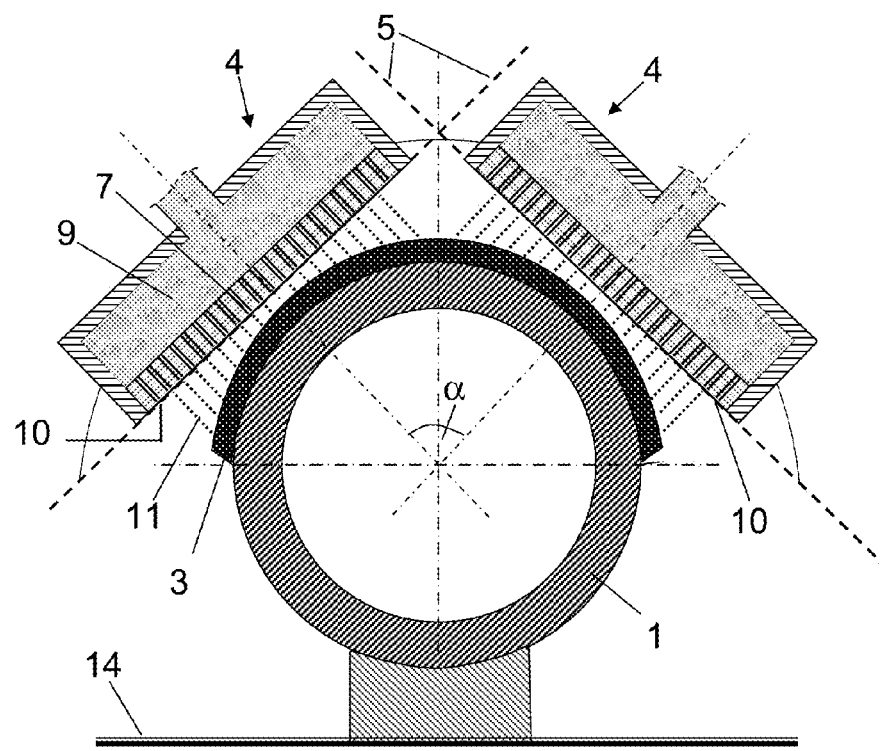
FIG. 2 provides an enlarged view of the reflector layer with the print head of FIG. 1 in the axial cross section along line A.

FIG. 1 shows schematically a horizontally oriented lamp tube 1 made of quartz glass having a lamp tube center axis 2 along which a partial circumference coating with a gold-containing reflector layer 3 is printed. FIG. 2 shows a view of the lamp tube 1 in a section A perpendicular to the longitudinal axis 2, in an enlarged representation. Both illustrations are not to scale. In particular, the thickness of the ink layer 3 is shown excessively thick for reasons of better visibility.

For each new printing process, a recipe is initially created that takes into account:

(i) the geometric shape of the glass profile to be printed and the coating contour, and (ii) the jet characteristics of the print head.

Glass Profile and Coating Contour:

The outer jacket of the lamp tube 1 having an outer diameter of 19 mm should be printed over a length of 1000 mm and over a circumferential angle of 180 degrees with a reflective gold layer having a thickness of 200 nm.

Printing Device:

The printer used for this purpose has two structurally identical, heatable print heads 4, which can be moved along a semicircle 12 (in FIG. 2 indicated by a dashed line). These are distributed uniformly about the upper circumferential half of the lamp tube 1 and arranged relative to each other at an angle $\alpha$ of 90 degrees.

The maximum printing width of a print head is 65 mm. Both print heads 4 are equipped with a number of 1024 printing cells that are arranged in a regular 2×512 pattern. Each printing cell has an ink outlet nozzle 7, which is connected by a feed channel to a printing medium storage container that can likewise be heated. Each printing cell is equipped with a piezo element by which the ink outlet nozzle 7 can be opened and closed on demand. For the separate control of the printing cells and for the movement control of the print head in a specified movement plane 8, a microcomputer is provided.

Printing Ink:

A commercially available, metallo-organic, gold-containing ink is used, in which 15 weight percent elemental gold in an organic complex is dissolved in a solution made of n-heptane, turpentine oil, ethanol, and ethylene carbonate.

This ink is created to have properties so that it can be printed by inkjet technology, such that it produces good wetting with the glassy lamp surface and does not easily run off or form droplets. Its viscosity is set according to the temperature of the print head heating system and the storage reservoir heating system.

Printing Process:

First, the coverage of the surface to be coated with the ink is calculated, which is required to generate a specified minimum reflection with the lowest possible layer thickness of the final reflector layer (=minimum coverage). The minimum reflection is typically greater than 90%, determined using the IEC 62798 standard ("Test method for infrared emitters"). The ink is deposited using a program-controlled method, such that a surface coverage according to the minimum coverage is generated.

This layer thickness, depending on the requirement for the degree of reflection, lies in the range of 50 nm to 200 nm. The required thickness of the fluid coating medium layer and the consumption of coating medium are determined using the gold portion of the coating medium and by evaluating the flow rate of the individual outlet nozzles (by counting the droplets) and measuring the covered surface area.

The heating temperature is set to 35° C., and thus the viscosity of the printing medium is specified. Here, each droplet has a volume of 35 pl (picoliter). The droplet diameter of the ink droplets emerging from the outlet nozzles is therefore set to approximately 100 µm. The outlet openings of the nozzles 7 of a print head 4 lie in a common outlet plane 5. The distance between the outlet plane 5 and the coating surface 6 varies from nozzle to nozzle, but is held constant during the printing process. On average, it is approximately 1 mm, so that the average striking distance of a droplet is approximately 35 µm. The printing frequency is 5 kHz (5000 droplets/s).

The lamp tube 1 is guided by a transport conveyor 14 at a specified distance of approximately 1 mm under the stationary print heads 4 using a program-controlled method. Here, the gold-containing ink 9 emerges in the shape of fine droplets 11 (see FIG. 2) from the nozzles 7 and is printed within the specified circumferential angle of 180 degrees (see FIG. 2) on the surface of the lamp tube 1.

For generating the desired layer thickness, a single layer deposition is sufficient. The ink layer 3 forms a longitudinal strip that extends along the center axis over a circumferential angle of 180 degrees of the lamp tube outer surface. Each of the two print heads 4 is designed for depositing a partial coating over a partial circumference of 90 angular degrees, whereby it is ensured that the partial coatings abut each other or overlap. Here, several of the outer nozzles 10 on both sides of the 2×512 pattern, which have the greatest distance to the coating surface 6, can be switched off.

The layer 3 is heated during the printing process and in this way easily dried. After reaching the nominal thickness, the dried ink layer 3 is burned-in by heating to 700° C. in air, and thereby converted into a reflective layer. Here, the organic components are oxidized or volatilized, which results in a thorough cross linking and formation of a closed metal layer having good adhesion to the glass of the lamp tube 1.

The generated gold-containing reflector layer has a nominal thickness of 200 nm. The uniformity of the layer thickness is evidenced by a thickness measured at five uniformly distributed measurement positions that deviates by a maximum of 20 nm from the desired thickness.

This layer has a weight of 0.75 g (per tubular meter) of coating agent having a nominal content of pure gold of 0.12 g. The actual consumption is 0.13 g, and thus only approximately 8% over the theoretical value.

The adhesion is determined by a so-called "tape peel-off test." Sufficient adhesion is shown if no metallic traces can be detected on the tape with the naked eye after an adhesive tape is applied to the surface and then immediately peeled off.

The printing method of the present invention is indeed optimized for the printing of cord-shaped glass profiles. In the same printing process and by the same printing device, however, in addition in the area of the one end of the lamp tube 1, lines for an electrical circuit are printed that form part of a temperature sensor by which the operating state of the lamp can be detected.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. Method for producing a reflector on a reflector base (1) made of glass having a curved surface, the reflector base (1) being formed on a lamp bulb of an infrared emitter, the curved surface being provided in the area of a coating surface with a metal-containing mirror-reflective layer (3), the method comprising:
depositing a metal-containing coating fluid (9) on the coating surface (6), and
subjecting the deposited coating fluid to a burning-in treatment at a temperature below a softening temperature of the glass forming the reflector layer (3),
wherein the coating fluid is deposited using a contactless method by inkjet technology,
wherein the coating fluid (9) is moved by a plurality of print heads (4), each of the print heads (4) being equipped with a plurality of nozzles (7) and movable at least in a movement plane (8) relative to the coating surface, and the coating fluid is sprayed onto the coating surface (6) by the print heads under pressure and in the form of droplets (11) emerging from the nozzles (7) to form the reflective layer (3) to partially cover the curved surface, the plurality of print heads having nozzle outlet planes (5) that enclose an angle of 90 degrees or less.

2. Method according to claim 1, wherein the coating fluid (9) contains the metal in elemental form.

3. Method according to claim 1, wherein the coating fluid (9) has a viscosity in the range of 10 to 30 mPa·s.

4. Method according to claim 1, wherein the relative movement between the coating surface (6) and the plurality of print heads (4) comprises a translational movement of the reflector base along the print heads (4).

5. Method according to claim 1, wherein the reflector base (1) is provided as a cylinder and the coating surface (6) is provided as a longitudinal strip on an outer surface extending over a partial circumference of the cylinder, and wherein each of the plurality of print heads (4) is designed to deposit the coating fluid (9) over a partial circumference of 60 angular degrees.

6. Method according to claim 5, wherein the longitudinal strip has a width in the range of 20 to 65 mm.

7. Method according to claim 5, wherein the method utilizes two to three print heads (4).

8. Method according to claim 1, wherein the plurality of nozzles (7) of each print head (4) have outlet openings running in a common outlet plane (5), and wherein between the nozzle outlet planes (5) and the coating surface (6) a distance in the range of 5 to 10 mm is set.

9. Method according to claim 1, wherein the reflector layer (3) is generated whose desired thickness is in the range of 50 nm to 200 nm, and wherein a thickness measured at five measurement positions distributed over the reflector layer (3) deviates by a maximum of 10% from the desired thickness.

10. Method according to claim 1, wherein the coating fluid (9) is deposited in a structure that generates transitions between transmission and reflection after the burning-in process.

11. Method according to claim 1, wherein the reflector base (1) is provided as a cylinder and the coating surface (6) is provided as a longitudinal strip on an outer surface extending over a partial circumference of the cylinder, and wherein each of the plurality of print heads (4) is designed to deposit the coating fluid (9) over a partial circumference of 90 angular degrees.

* * * * *